(No Model.) 2 Sheets—Sheet 1.
W. H. STEWART.
CHECK ROW ATTACHMENT FOR CORN PLANTERS.
No. 309,004. Patented Dec. 9, 1884.
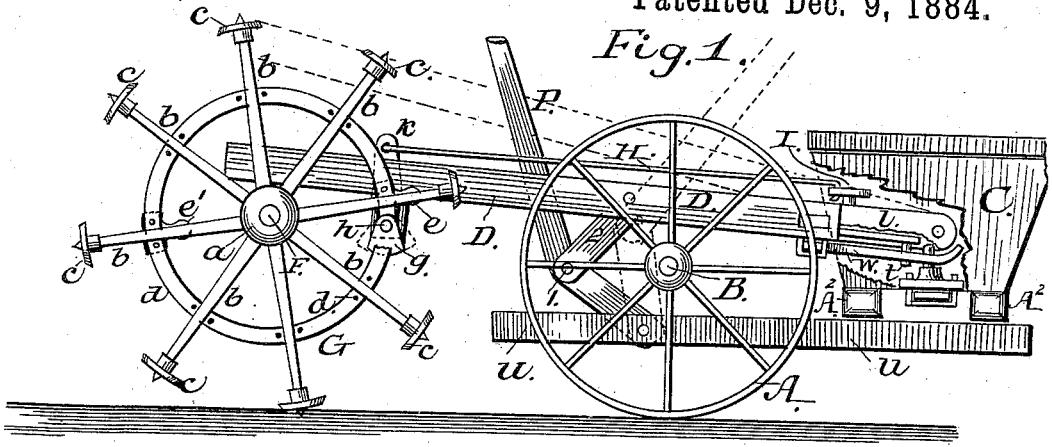
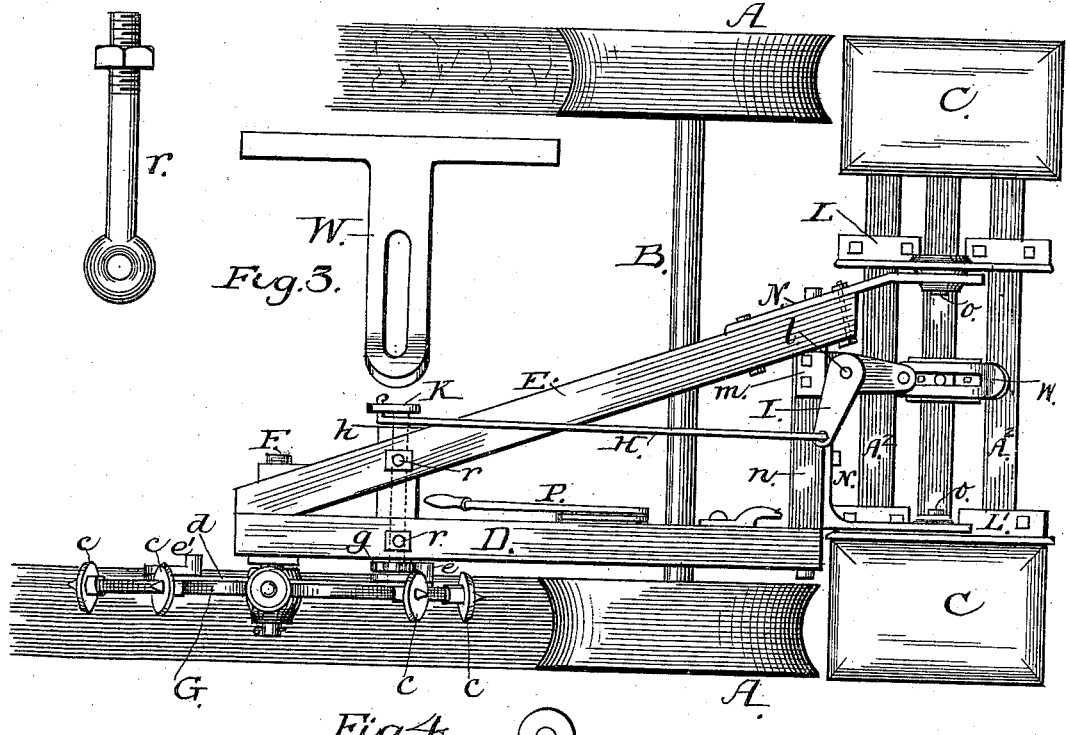
Attest:
S. Walter Fowler
H. B. Applewhaite
Inventor:
Wm. H. Stewart
per Attys.
A. H. Evans & Co.

(No Model.)
W. H. STEWART.
CHECK ROW ATTACHMENT FOR CORN PLANTERS.
No. 309,004. Patented Dec. 9, 1884.
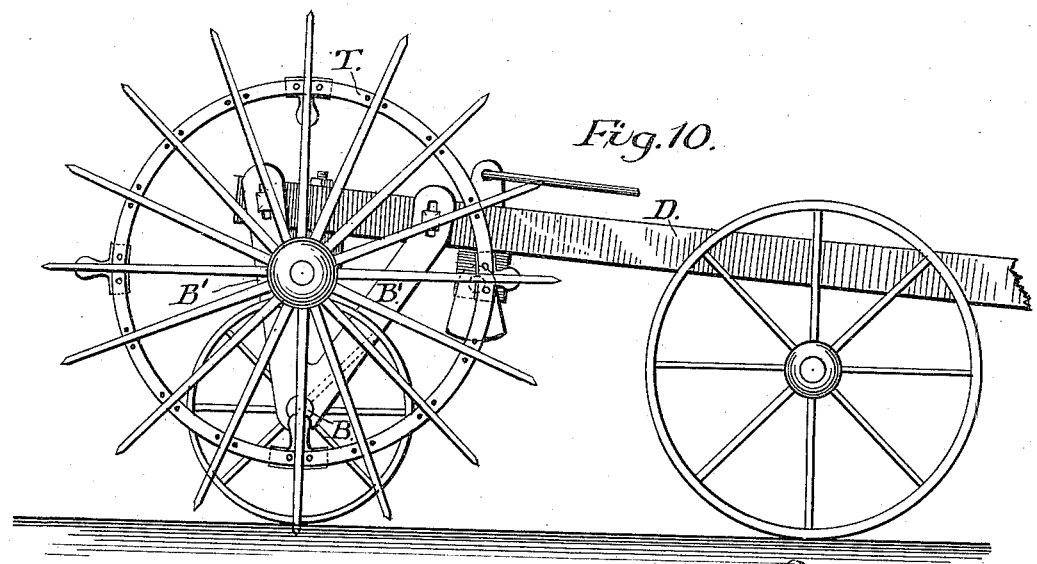
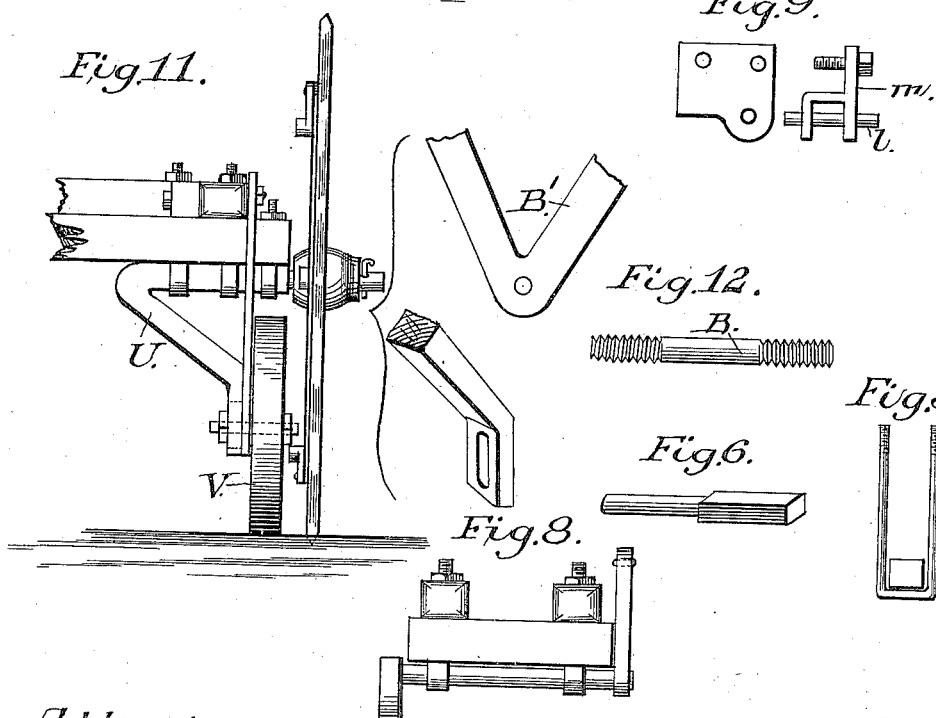

UNITED STATES PATENT OFFICE.

WILLIAM H. STEWART, OF BOONVILLE, MISSOURI, ASSIGNOR OF ONE-HALF TO C. C. GIBSON, OF SAME PLACE.

CHECK-ROW ATTACHMENT FOR CORN-PLANTERS.

SPECIFICATION forming part of Letters Patent No. 309,004, dated December 9, 1884.

Application filed July 23, 1884. (No model.)

*To all whom it may concern:*

Be it known that I, WILLIAM H. STEWART, of Boonville, in the county of Cooper and State of Missouri, have invented certain new and useful Improvements in Check-Row Attachments for Corn-Planters, of which the following is a full, clear, and exact description, reference being had to the accompanying drawings, forming part of this specification, in which—

Figure 1 is a side elevation of a portion of a corn-planter with my improvements attached. Fig. 2 is a plan view of the same. Figs. 3 to 9 are details of construction to be referred to. Figs. 10, 11, and 12 illustrate modifications to be referred to.

My invention relates to an improvement in corn-planters; and it consists in the construction and arrangement of a check-row and self-dropping attachment, and in certain details of construction, all of which will be hereinafter more fully set forth, and specifically pointed out in the claims.

To enable others skilled in the art to make and use my invention, I will proceed to describe the exact manner in which I have carried it out.

In the said drawings, A represents the wheels, B the axle, and C the seed-boxes, of an ordinary corn-planter, which may also be provided with the usual runners or shoes. (Not shown.)

D and E represent bars of wood or other material, which are arranged so that they may be passed forward and over the main frame or body of the planter, and one end of these bars may be loosely fixed or pivoted at or near the seed-slide, as will be hereinafter more fully set forth.

The bar D above referred to is secured to the outer end of bar E by any well-known means, and, after passing forward over the frame of the planter and being loosely secured, as shown, it assists in securing my device in its proper place.

Suitably journaled in a timber secured on the under side and outer ends of the bars D and E is a shaft, F, upon one end of which is mounted a wheel, G, which is made preferably in the form shown in Fig. 1, and it has a hub, $a$, with a series of radiating spokes or arms, $b$, at equal distance apart, each spoke being provided with a casting, $c$, having an opening, through which the outer ends of arms $b$ (which may be pointed, as shown) pass, and in which they are secured by bolts or otherwise. If desired, the castings $c$ may be dispensed with, which would be the case when the construction shown in Fig. 12 is used.

At a point near the center of the spokes or arms, and secured thereto on one side by any well-known means, is a metallic band or annular ring, $d$, having perforations made therein for the reception of the L-shaped lugs $e$ $e'$, as will be hereinafter more fully set forth. The axle or shaft F is secured to the bars D and E by means of U-shaped bolts $f$, having threaded ends adapted to receive nuts, and thereby hold the shaft in position. This shaft F is preferably constructed in the form shown in Fig. 6, and it is provided with a squared portion, which passes through the U-shaped bolts, and a cylindrical portion, upon which is mounted the wheel G, thereby permitting the said wheel to freely revolve and to travel directly behind the main supporting-wheels A in the path over which they have just passed, which is the essential feature of my present invention.

As before stated, the perforations in the metallic annular ring $d$ are adapted to receive and hold the L-shaped casting $e$, which are arranged to come in contact with a cam or similar device, $g$, mounted upon one end of a shaft, $h$, journaled in the beams D and E by means of bolts $r$, having an eye, through which the shaft passes and has a bearing, while on the opposite end of this shaft $h$ is secured a crank or eccentric, K, for a purpose to be hereinafter more fully set forth. The L-shaped castings are arranged so that one of them projects outward from the metallic band, while the other projects inward toward the center of revolution, and they are so arranged in relation to the cam $g$ that the said cam is reciprocated from one side to the other, and the openings in the seed-boxes C are alternately opened and closed. Any number of castings may be used.

H is a pitman, one end of which is secured to the crank or eccentric $k$, secured on the shaft $h$, while the other end extends forward and is connected to one end of a bell-crank lever, I, suitably pivoted upon a pin or bolt, $l$, which passes through a casting, $m$, having projecting flanges, which partially inclose a cross-bar, $n$, having its ends secured in the bars D and E, as shown in Fig. 2.

$A^2 A^2$ represent cross-bars usually employed in the construction of corn-planters. L L' represent castings, to which are bolted, by U-shaped bolts, the cross-bars $A^2$. These castings are each provided with an inwardly-projecting stud, $o$, adapted to engage an opening formed in the outer ends of angular castings N, secured to the cross-bar $n$ and bar E, respectively, in such manner that the entire frame upon which the wheel G and its connection are secured can be readily raised from the ground by means of a suitable lever, P, which is desirable when the machine is to be turned and in going from the field.

Beneath the cross-bar $n$, and secured thereto by U-shaped bolts or otherwise, is a T-shaped plate, W, having a slotted end (see Fig. 3) adapted to receive a pin, $t$, attached to one end of the bell-crank lever. The outer end of the plate T is preferably curved upward, as shown in Fig. 1. This construction enables the operator to raise the rear frame without throwing the pin $t$ out of engagement with the slotted end of the plate T.

The angular-shaped lever P, for raising or lowering the rear frame, is pivotally secured in a longitudinal beam, $u$, and it is connected at the point 1 with a connecting-link, 2, pivoted in the bar D.

Now, it is evident that my checking device can be adjusted to any horse-power corn-planter now in use, and corn can be dropped from one foot to four feet apart by changing wheel G, Figs. 1 and 2, and bars $A^2 A^2$ be drawn forward. Then wheel G, resting upon the ground, must be drawn forward also, and thereby made to travel around its center, and alternately bringing the pin or lug $e$ and $e'$ in contact with the cam $g$; and as the projection $e$ is farther from the center than the projection $e'$ nearer the center of wheel G, then will the lug $e$ come in contact with one side of cam $g$, driving it into the position shown by dotted line, and lug $e'$ come in contact with the cam $g$, resting at the dotted line, and drive it back to its former position; and it is also evident that if cam $g$ be ultimately driven backward or forward, as indicated by the dotted line, so will the crank $k$ be moved to dotted line and back to its present position, and this movement will cause the rod (by means of the bell-crank lever) to alternately open and close the feed-openings. It is also evident that if I place my hand upon the handle of lever P and press it forward to the dotted line, then must be substantially a toggled joint thereby formed and link 2 be straightened out, as indicated by dotted line, thereby lifting bar D up and wheel G free from the ground—a feature that is indispensable in turning around the rows, &c.; and as the driver can with his hand turn wheel G backward or forward until the device has caused the first hill of corn to be dropped, then by operating lever P wheel G will be lowered to the ground, when I will be ready to drive forward, and thus one of the features of my invention is made manifest. Again, if the operator wishes to drill his grain, he can do so by placing a greater number of lugs on the wheel G.

In Figs. 10, 11, and 12 I show additional means for securing and supporting the wheel for operating the seed-slide; but when this construction is used I employ another wheel of smaller diameter, as shown.

The rimless wheel T in the present case is constructed substantially as the wheel G; but the castings at the ends of the radiating spokes may be dispensed with.

To the rear ends of the bars D and E is suitably secured a V-shaped brace, B', the lower end of which furnishes a bearing for a shaft threaded at both ends, as shown in Fig. 12.

U represents an angular bar suitably secured to the frame, and having one end turned to form an axle for the wheel T, while the lower end of this bar is provided with an elongated slot, through which passes the shaft 3, which is secured by nuts, so that the supplemental supporting-wheel V turns on said shaft in close proximity to the rimless wheel T, and also in the path made by the main wheel. This construction enables me to regulate the depth of the radiating spokes in the ground, and this depth may be determined by adjusting the shaft 3 in the slotted end of the angular bar, as shown.

Having thus described my invention, what I claim as new, and desire to secure by Letters Patent, is—

1. In combination with the wheel G and axle, constructed as described, the metallic ring $d$, perforated as shown, and provided with inwardly and outwardly projecting lugs, and mechanism for alternately opening and closing the feed-openings, consisting of a cam, $g$, shaft $h$, crank $k$, pitman H, plate W, and bell-crank lever I, substantially as herein specified.

2. In a corn-planter, and in combination with a swinging frame having the bars D and E, with the castings N, as described, the shaft $h$, provided with a cam, $g$, and a crank, $k$, the bolts $r$, having an eye, through which the shaft $h$ passes, and mechanism, as described, for effecting the throw of the feed-slide, consisting of the pitman H, slotted plate W, and bell-crank lever I, substantially as described.

3. In a corn-planter, the shaft $h$, cam $g$, and crank $k$, in combination with a pitman attached to a bell-crank lever attached to a slotted plate, W, on the forward part of the frame, and inwardly and outwardly projecting lugs, $e$, secured to a band, $d$, on a rimless wheel, for moving the cam $g$ to open and close the feed-apertures, substantially as and for the purpose herein set forth.

4. In a corn-planter, and in combination with a bell-crank lever and its operating mechanism, the T-shaped plate W, slotted as shown, and having a curved end, substantially as herein set forth.

5. In combination with a corn-planter having a seed-slide, and the castings M, as described, the swinging frame consisting of the bars D and E, suitable cross-bars and castings, N, the wheel G, as described, lugs $e\ e'$ upon said wheels, the cam $g$, shaft $h$, crank $k$, pitman connecting the crank to a bell-crank lever, journaled as described, and a T-shaped plate, W, and a lever by the movement of which the swinging frame may be raised from the ground, all constructed to operate substantially as herein set forth.

WILLIAM H. STEWART.

Witnesses:
A. H. SUNTER,
W. S. HALLER.